United States Patent
Jacobs et al.

(10) Patent No.: US 8,983,764 B2
(45) Date of Patent: Mar. 17, 2015

(54) DYNAMIC DETERMINATION OF DEVICE LOCATION REPORTING FREQUENCY

(71) Applicants: Aaron Joseph Jacobs, Pyrmont (AU); Michael Steven Perrow, Pyrmont (AU)

(72) Inventors: Aaron Joseph Jacobs, Pyrmont (AU); Michael Steven Perrow, Pyrmont (AU)

(73) Assignee: Google Inc., Mountain View, CA (US)

( * ) Notice: Subject to any disclaimer, the term of this patent is extended or adjusted under 35 U.S.C. 154(b) by 68 days.

(21) Appl. No.: 13/853,690

(22) Filed: Mar. 29, 2013

(65) Prior Publication Data

US 2014/0278044 A1   Sep. 18, 2014

Related U.S. Application Data

(60) Provisional application No. 61/789,043, filed on Mar. 15, 2013.

(51) Int. Cl.
*G06F 17/10*   (2006.01)
*G06F 17/00*   (2006.01)
*G06Q 10/00*   (2012.01)

(52) U.S. Cl.
CPC ............... *G06F 17/00* (2013.01); *G06Q 10/00* (2013.01)
USPC ...................................................... 701/300

(58) Field of Classification Search
CPC ... G01C 21/26; G01C 21/3697; H04W 4/026; H04W 4/027; H04W 4/028; G01S 5/0027; G01S 19/41; G06F 17/00; G06Q 10/00
USPC ...................................................... 701/300
See application file for complete search history.

(56) References Cited

U.S. PATENT DOCUMENTS

| 5,825,283 | A  | * | 10/1998 | Camhi .......................... 340/438 |
| 6,993,421 | B2 | * | 1/2006  | Pillar et al. .................... 701/29.4 |
| 7,330,788 | B2 |   | 2/2008  | Mikuriya et al. |
| 7,373,247 | B2 |   | 5/2008  | Park |
| 7,869,945 | B2 | * | 1/2011  | Huang et al. .................. 701/517 |
| 8,060,400 | B2 | * | 11/2011 | Wellman ....................... 235/375 |
| 8,060,419 | B2 | * | 11/2011 | Doyle et al. .................... 705/34 |
| 8,229,462 | B2 | * | 7/2012  | Bennett, Jr. ................. 455/456.1 |
| 8,725,345 | B2 | * | 5/2014  | de Oliveira et al. .......... 701/29.5 |

(Continued)

FOREIGN PATENT DOCUMENTS

| EP | 1770366 A1     | 4/2007  |
| WO | WO-2004/102986 A2 | 11/2004 |
| WO | WO-2005015129 A1  | 2/2005  |

OTHER PUBLICATIONS

International Search Report and Written Opinion for Application No. PCT/US2014/027365, dated Jul. 17, 2014.

*Primary Examiner* — Mary Cheung
*Assistant Examiner* — Frederick Brushaber
(74) *Attorney, Agent, or Firm* — Marshall, Gerstein & Borun LLP

(57) ABSTRACT

A mobile device associated with a mobile asset (and a method operating on such a mobile device) determines the location of the mobile asset and reports the location to a tracking server. To conserve power and bandwidth resources, the mobile device reports the current location and movement data of the mobile asset initially and then upon determination of the existence of one or more conditions. Potential conditions that could cause the mobile device to send an update to the server are a change from one road to another, a change in velocity or direction greater than a predetermined threshold, a deviation from an assigned or predicted route, or a difference between a current location and a predicted location.

20 Claims, 5 Drawing Sheets

(56) References Cited

U.S. PATENT DOCUMENTS

| | | |
|---|---|---|
| 8,780,788 B2 * | 7/2014 | Peach et al. .......... 370/319 |
| 2004/0034470 A1 | 2/2004 | Workman |
| 2004/0039504 A1 | 2/2004 | Coffee et al. |
| 2006/0187026 A1 | 8/2006 | Kochis |
| 2007/0262861 A1 | 11/2007 | Anderson et al. |
| 2010/0097208 A1 | 4/2010 | Rosing et al. |
| 2011/0231354 A1 * | 9/2011 | O'Sullivan et al. .......... 706/46 |
| 2012/0130637 A1 | 5/2012 | Strassenburg-Kleciak |
| 2013/0002481 A1 | 1/2013 | Solomon |

* cited by examiner

DYNAMIC DETERMINATION OF DEVICE LOCATION REPORTING FREQUENCY

CROSS-REFERENCE TO RELATED APPLICATION

The present application claims the benefit of U.S. Provisional Patent Application No. 61/789,043 filed Mar. 15, 2013, the disclosure of which is incorporated herein by reference in its entirety for all purposes.

TECHNICAL FIELD

The present disclosure relates to fleet management systems for tracking vehicles in a fleet and, in particular, to dynamically determining the frequency with which a device reports its location to a central tracking server.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

As mobile data and civilian location positioning systems proliferate, one widespread use of these systems is the tracking and management of mobile assets such as vehicle fleets and workforce resources. Such systems generally use a position-determining device (e.g., a Global Positioning System (GPS) receiver) associated with a mobile asset to determine the location of the asset. Using a communication channel—typically a wireless channel such as a mobile telephony channel, a mobile broadband channel, a terrestrial microwave channel, or a satellite channel—the device reports its current location to a central tracking server that tracks and manages the assets.

Owing to the mobile nature of the position-determining devices, such devices typically rely on portable power sources (e.g., batteries), rather than line power. For this reason, and because wireless communication channels are generally bandwidth constrained, there is an inherent tension between power conservation and position accuracy. Specifically, the more frequently a mobile asset reports its location, the more accurately its location will be tracked, but the greater energy resources it will consume. Generally, this tension is "resolved" by setting a tracking device to report a position on a regular interval that is a trade-off between power conservation and position accuracy.

SUMMARY

A mobile device for tracking a mobile asset reports the location of the mobile asset initially and thereafter reports the location of the mobile asset upon the occurrence of one or more pre-determined conditions. The mobile device may receive from a GPS receiver location data associated with the initial location of the mobile asset and transmit the initial location to a tracking server. Thereafter, the mobile device may continue to monitor data from the GPS receiver continuously or, to save power, only periodically. Alternatively, the mobile device may monitor sensors, such as accelerometers, compasses, and the like, other than the GPS receiver. When a reporting condition is satisfied, the mobile device may determine the current location of the mobile asset and transmit the current location of the mobile asset to the tracking server.

The reporting conditions may include receiving an indication that the mobile asset has deviated from the path of a road along which it was traveling. The reporting conditions may also include detecting a change in velocity and/or direction of the mobile asset above a pre-determined threshold. Further, the reporting conditions may include determining that the mobile asset has deviated from a predicted or assigned route. Additionally, the reporting conditions may include detecting a difference between a current location of the mobile asset and a predicted location of the mobile asset exceeds a predetermined threshold. The reporting conditions may be detected from data received from a positioning system receiver, such as a GPS receiver, data received from various sensors (e.g., accelerometers, compasses, etc.), data received from wireless networks (e.g., from mobile telephony and/or mobile internet networks).

A method is executed by a processor in a mobile device. The method is for reporting to a server a position of a mobile asset associated with the mobile device. The method includes determining a current location of the mobile asset and determining current movement data of the mobile asset. The method further includes determining a first road corresponding to the current location and movement data and receiving road segment map data corresponding to the first road. Further, the method includes transmitting to the server the first location and movement data. Still further, the method includes receiving an indication that (i) the mobile asset has deviated from the path of the first road, (ii) the velocity of the mobile asset has changed by an amount greater than a predetermined threshold, (iii) the mobile asset has deviated from a predicted or assigned route, or (iv) a difference between a current location of the mobile asset and a predicted location of the mobile asset exceeds a predetermined distance and, in response to the received indication, transmitting to the server updated location and movement data.

A computer-readable storage medium stores instructions for tracking a mobile asset, executable by a processor in a mobile device. The instructions are operable upon execution by the processor to cause the process to determine a current location of the mobile asset and determine current movement data of the mobile asset. The instructions are further operable to cause the processor to determine a first road corresponding to the current location and movement data, and to transmit to the server first location and movement data. Further, the instructions are operable to cause the processor to receive an indication that (i) the mobile asset has deviated from the path of the first road, (ii) the velocity of the mobile asset has changed by an amount greater than a predetermined threshold, (iii) the mobile asset has deviated from a predicted or assigned route, or (iv) a difference between a current location of the mobile asset and a predicted location of the mobile asset exceeds a predetermined distance; and transmit to the server, in response to the received indication, updated location and movement data.

A mobile device operable to determine the position of an associated mobile asset, and to transmit to a server information about the position of the mobile asset, includes a processor, a satellite positioning system receiver communicatively coupled to the processor and operable to receive a plurality of signals from satellites and to determine from the received signals a current position of the mobile asset, and a wireless transmitter operable to transmit data to a server via a wireless channel. The mobile device also includes a computer-readable storage medium communicatively coupled to the processor storing instructions, executable by the processor, for causing the processor to transmit to the server a current location of the mobile asset when the processor determines that (i) the mobile asset has moved from a first road to a second road, (ii) the velocity of the mobile asset has changed by an amount greater than a predetermined threshold, (iii) the mobile asset has deviated from a predicted or assigned route, or (iv) a difference between the current location of the mobile asset and a predicted location of the mobile asset exceeds a predetermined distance.

A system for tracking mobile assets comprises a server having one or more server-side computer processors coupled to one or more server-side computer readable storage media. The server-side storage media store instructions operable to cause the one or more server-side processors to receive from a plurality of mobile devices location data and movement data corresponding to each of the mobile assets, periodically calculate estimated updated location data for each of the mobile assets according to the received location data and movement data, and receive actual updated location data for each of the mobile assets at intervals determined by the mobile devices. The system also includes a mobile device that includes one or more client-side computer processors, a satellite position system receiver communicatively coupled to the one or more client-side computer processors and operable to receive a plurality of signals from satellites, and a wireless transmitter operable to transmit data to the server via a wireless channel. The mobile device also includes one or more client-side computer readable storage media communicatively coupled to the one or more client-side computer processors. The client-side storage media store instructions operable to cause the one or more client-side processors to determine a current location of the mobile asset according to data received from the satellite positioning system receiver, determine current movement data of the mobile asset according to data received from the satellite positioning system receiver, determine a first road corresponding to the current location and movement data, and transmit to the server first location and movement data. Further, the client-side storage media store instructions operable to cause the one or more client-side processors to receive an indication that (i) the mobile asset has deviated from the path of the first road, (ii) the velocity of the mobile asset has changed by an amount greater than a predetermined threshold, (iii) the mobile asset has deviated from a predicted or assigned route, or (iv) a difference between a current location of the mobile asset and a predicted location of the mobile asset exceeds a predetermined distance and, in response to the received indication, transmit to the server updated location and movement data. The server-side storage media may also store instructions operable to cause the server-side processors to determine for each mobile asset, according to the received location data for the mobile asset and a known destination for the mobile asset, a predicted or assigned route for the mobile asset. Further, the server-side storage media may store instructions operable to cause the one or more server-side processors to retrieve, for a given mobile asset, current or historical traffic data for the first road, and periodically calculate the estimated updated location data for the given device according to the received location data and movement data and also the retrieved traffic data for the first road.

A mobile device is operable to determine the position of an associated mobile asset and to transmit to a server information about the position of the mobile asset. The mobile device includes processing means, means for determining from a plurality of satellite signals a location of the mobile asset, and means for transmitting data to the server via a wireless channel. The mobile device also includes means for determining the existence of a condition indicating that an updated location of the mobile asset should be transmitted to the server and means for transmitting the updated location of the mobile asset. The means for determining the existence of the condition include means for determining that (i) the mobile asset has moved from a first road to a second road, (ii) the velocity of the mobile asset has changed by an amount greater than a predetermined threshold, (iii) the mobile asset has deviated from a predicted or assigned route, or (iv) a difference between the current location of the mobile asset and a predicted location of the mobile asset exceeds a predetermined distance.

DETAILED DESCRIPTION

An apparatus or system operating according to the present disclosure facilitates tracking of one or more mobile assets using a device capable of determining its position and reporting the device's (and the asset's) position, with dynamically determined frequency, to a server. To this end, the mobile device transmits its location (and that of the associated asset) to a server. Throughout this description, the position of the mobile device is assumed to be the same as that of the mobile asset. Therefore, to the extent that the terms "mobile device" and "mobile asset" are used interchangeably it is because mobile device is assumed to be tied to the location of the mobile asset. It should be understood, however, that the mobile device need not be the same as the mobile asset and that, in fact, the two may be different physical entities. In any event, in contrast to prior art systems, in which the mobile device transmits the location to the server periodically—at pre-programmed intervals—the mobile device instead monitors its position and/or movement for an indication that its movement has changed in some regard or deviated from what is expected by the server. For example, the mobile device may monitor its movement or its position to determine if it has changed from one road to another, may monitor its movement or position to determine if its velocity has changed by more than a threshold amount, may monitor its location to determine if it has deviated from a predicted or assigned route, or may monitor its location to determine if a difference between its current location and a predicted location exceeds a threshold amount. If the mobile device determines that a change or deviation has occurred, then the mobile device transmits its updated location to the server.

Figure 1:
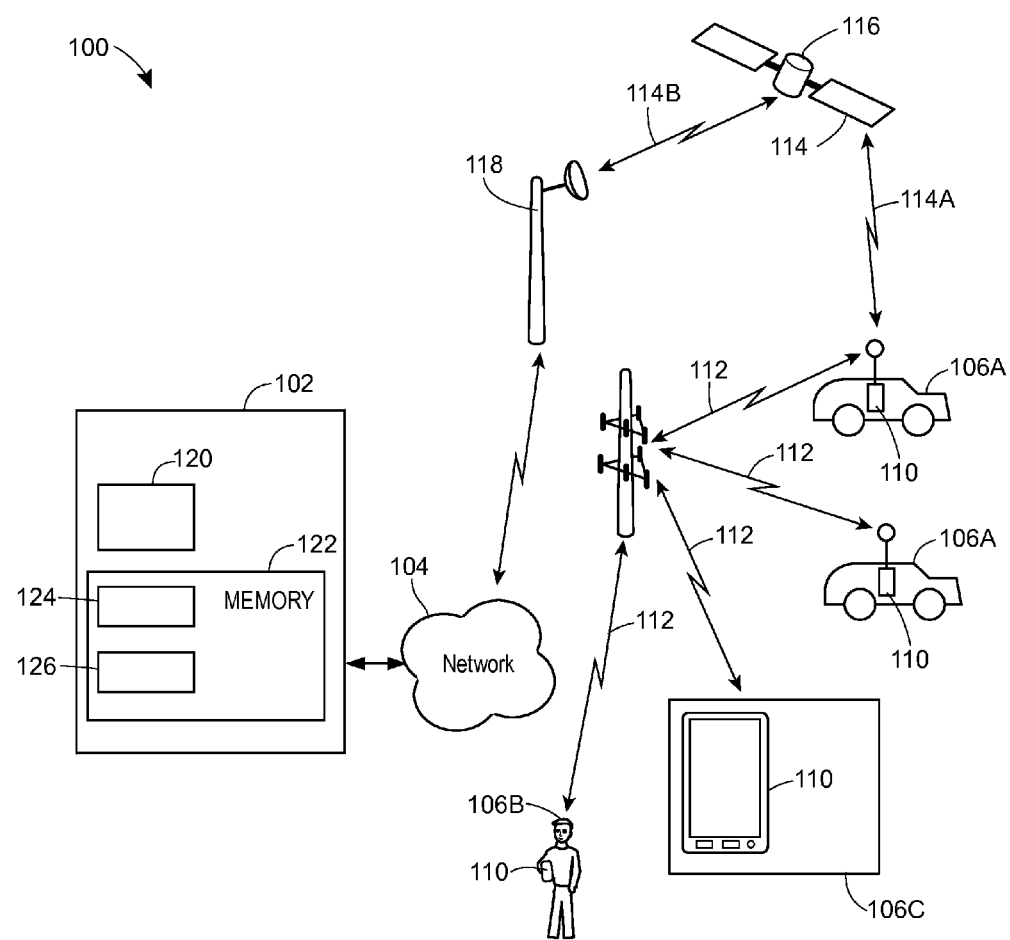
FIG. 1 illustrates an exemplary system implementing dynamic determination of device location reporting frequency in accordance with the present description.

FIG. 1 illustrates an exemplary system 100 operating according to the principles described herein. In the system 100, a server 102 communicates via a network 104 with devices associated with a group of mobile assets 106A-D. The mobile assets 106A-D may be any mobile assets that the system operator wishes to track, including, for example, vehicles 106A (e.g., automobiles, delivery trucks, aircraft, etc.), workforce assets 106B (i.e., people), cargo 106C, and the like. In any event, each mobile asset 106A-D has associated with it a mobile device 110 that is operable to determine the location of the mobile device 110 (and the associated mobile asset 106A-D) and, in some embodiments, the movement of the mobile device 110, and to report the location (and movement) to the server 102 using the network 104.

Each mobile device 110 generally determines its position using a positioning system receiver and, in some embodiments, a satellite positioning system receiver. The positioning system receiver can be any type of positioning system receiver, operating off of terrestrial navigation signals, satellite navigation signals, etc. Where satellite navigation signals are employed for positioning, the receiver can receive signals from the Global Positioning System (GPS) satellite constellation, the European Galileo Global Navigation Satellite System (GNSS), the Russian Global Navigation Satellite System (GLONASS), etc. For convenience, throughout the remainder of this description, the positioning system will be referred to as a GPS system, the satellites will be referred to as GPS satellites, and the positioning-system receiver operating in the mobile device 110 will be referred to as a GPS receiver. However, it should be understood that while described in terms of the GPS system, satellites, and receiver, the positioning system may use any positioning system/navigation technology, the satellites may be any orbiting space vehicle, and the receiver may be any receiver operable to receive the signals necessary to determine from the positioning system the location of the mobile device 110.

Each mobile device 110 communicates with the server 102 using the network 104, which may be, for example, the Internet. However, each mobile device 110 may use a wireless communication channel 112 to send data from the mobile device 110 to the network 104. Throughout this specification, the wireless channel 112 used to relay information from the mobile device 110, through the network 104, to the server 102, will be described in terms of a mobile telephony signal/system 113, such as that generally employed by mobile phones and other devices sending telephony or data over networks owned by mobile carriers. It will be understood, though, that in some embodiments, the mobile devices 110 may communicate data to the server 102 by means of a satellite data link 114. That is, the mobile device 110 may communicate over a data uplink 114A to a satellite 116 which, in turn, may transmit data using a data downlink 114B to a communication point 118, which may transmit the data to the server 102 directly or via the network 104. As yet another alternative, the wireless channel 112 over which the mobile device 110 communicates data to the network 104 is a terrestrial microwave link. As still another example, the wireless channel 112 may be a proprietary wireless system owned or leased by the entity tracking the mobile assets.

Generally, the mobile device 110 may be any multi-purpose mobile device, such as a smart-phone, a tablet computer, a laptop computer, a smart watch, a portable digital assistant, etc., or may be a specialized mobile device designed for the specific purpose of facilitating tracking of a mobile asset. The mobile device 110 has, at a minimum, a positioning system receiver, a transmitter operable to communicate data to the server 102 over the network 104 using the wireless channel 112, a computer processor, a power circuit, and a variety of routines for performing various operations associated with determining the position of the device, power management, and communication of data to the server 102. As will be described below with reference to various embodiments, the mobile device 110 may have additional features that may be used to provide additional functionality.

Figure 2:
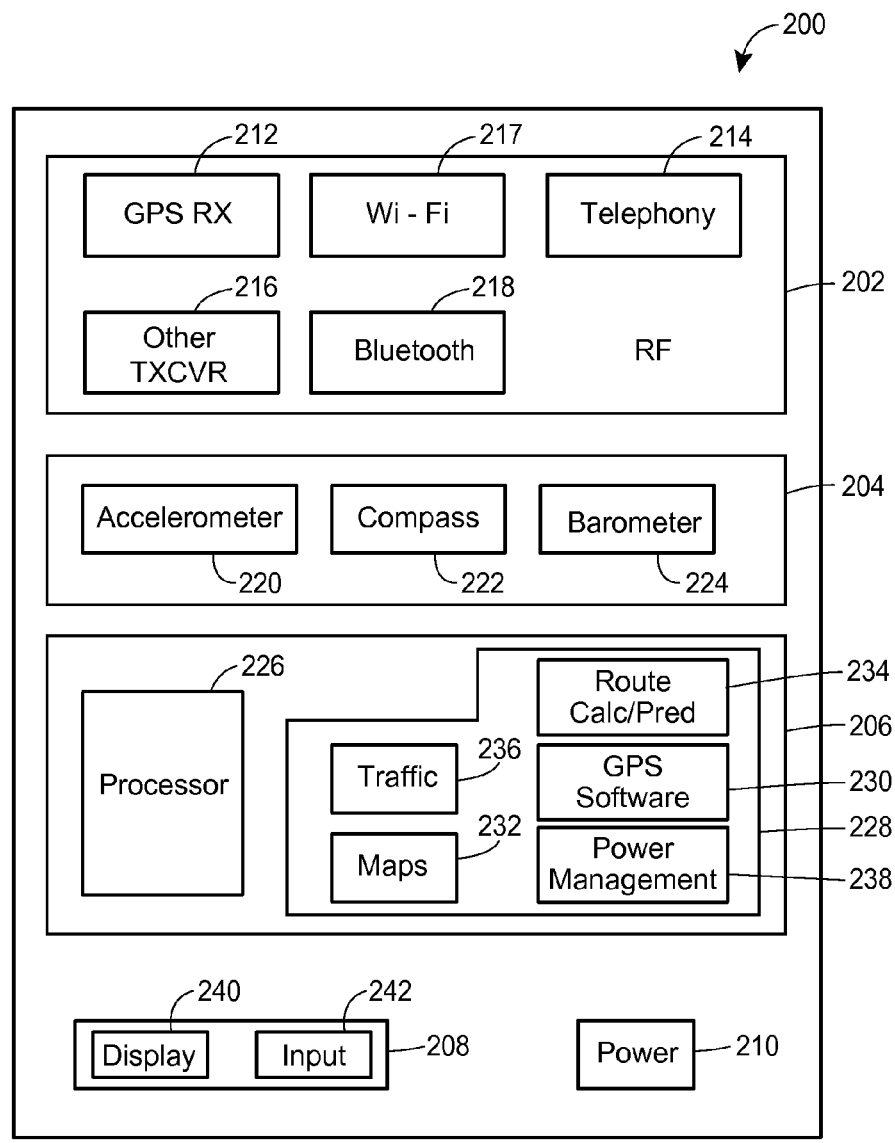
FIG. 2 is a block diagram depicting an exemplary mobile device implementing dynamic determination of location reporting frequency.

FIG. 2 is a block diagram of an exemplary mobile device 200. While the mobile device 200 depicted in FIG. 2 includes many more features than the required features described above, it should be understood that the mobile device 110 need not include every one of the features depicted, and that various combinations of features will be readily apparent from the description that follows. Generally, the mobile device 200 of FIG. 2 includes an RF block 202, a sensor block 204, a processor block 206, an input/output block 208, and a power source 210. The elements 202-210 may all enclosed within a single enclosure, such as when the mobile device 200 is implemented as a smart-phone.

The RF block 202 includes receiver and transmitter components of the mobile device 200. As described above, this includes at least a positioning system receiver, such as a GPS receiver 212, and a transmitter operable to communicate data to the server 102 over the network 104 using the wireless channel 112, such as a mobile telephony transceiver 214 or another transmitter (or transceiver) 216. As is generally understood, the GPS receiver 212 is operable to receive signals from multiple satellites in Earth orbit and, by comparing the signals, the GPS receiver 212 is operable, using a built-in processor or an external processor, to triangulate to determine the location of the receiver 212. The mobile telephony transceiver 214 is operable to communicate with one or more mobile telephony networks, including, but not limited to, networks using any of the following protocols: IS-95 (CDMA), Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), Integrated Digital Enhanced Network (iDEN), Long Term Evolution (LTE), etc. The mobile telephony transceiver 214 may be operable in the mobile device 200 to facilitate voice communications (e.g., to make phone calls) and/or to communicate data. That is, in some embodiments, the mobile telephony transceiver 214 may allow the mobile device 200 to operate as a mobile telephone and/or to transmit data to the server 102. In other embodiments, the mobile telephony receiver 214 may facilitate only voice communications, while the other transceiver 216 may facilitate data communication to the server 102. In still other embodiments, the mobile telephony receiver 214 may be omitted, and the other transceiver 216 may facilitate communication of data to the server 102.

In any event, the RF block 202 may also include a wireless internet transceiver 217 (e.g., one operating according to one or more of the 802.11a/b/g/n/ac protocols). The wireless internet transceiver 217 may operate according to known principles to allow the mobile device 200 to communicate on a local network and/or to communicate via the local network to the Internet 104. In some instances, the mobile device 200 may use wireless internet transceiver 217 to communicate data to the server 102 when an appropriate connection is available. The mobile device 200 may, therefore, use the transceivers 214 and/or 216 when the wireless internet transceiver 217 does not have a connection to the internet 104, but may use the wireless internet transceiver 217 when a connection to the internet 104 is available through the transceiver 217. The wireless internet transceiver 217 may also, in some embodiments, be used to scan for available wireless internet access points and, by referencing a database of locations associated with those access points, be able to provide course and/or fine location data for the mobile device 200. This location information may be used by the mobile device 200 to assist the GPS receiver 212 or, when the GPS receiver 212 is powered down, may be used by the mobile device 200 to approximate the current location of the mobile device 200.

The RF block 202 may also, in some embodiments, include a Bluetooth transceiver 218. The Bluetooth transceiver 218 may allow the mobile device 200 to communicate with other, nearby devices. For example, in an embodiment in which the mobile device 200 is a stand-alone tracking device (e.g., not part of a smart-phone), the Bluetooth transceiver 218 may facilitate communication between the mobile device 200 and a smart-phone, laptop, tablet, or other device. In still other embodiments, the mobile device 200 may not include the telephony and/or other transceivers 214 and 216, and may instead rely on an external device, with which the mobile device 200 communicates via the Bluetooth transceiver 218, to communicate data to the server 102 via the internet 104.

The mobile device 200 also includes the sensor block 204, which may include one or more of an accelerometer 220, a compass 222, and a barometer 224. The mobile device 200 and, more particularly, routines operating on the mobile device 200 may use data received from the sensors 220-224 to augment data received from the GPS receiver 212. For example, data from the barometer 224 may help a routine operating on the mobile device 200 to determine an altitude of the mobile device 200, which altitude may help establish whether the device is on one road or another road, for example. During periods where the GPS receiver 212 is powered down or unable to receive sufficient signals from the GPS satellites, the routines operating on the mobile device 200 may use data from the sensor block 204 to provide dead reckoning capability, and/or to detect changes in vehicle speed and/or direction, as will be described below.

The processor block 206 includes a computer processor 226 and a memory device 228. The computer processor 226 may be a general purpose computer processor or a special purpose computer processor specially adapted to perform the functions of the mobile device 200. The computer processor 226 is communicatively coupled to the memory device 228, such that the computer processor 226 may retrieve instructions from the memory device 228 and store and retrieve data from the memory device 228. The memory device 228 may store (and the processor 226 may execute) various routines 230-238. For example, a routine 230 may include instructions for retrieving/receiving and processing data from the GPS receiver 212. The routine 230 may, in some embodiments, include instructions that program the processor 226 to receive data from the GPS receiver 212 and, from the received data, determine a location of the mobile device 200. In other embodiments (e.g., where the GPS receiver 212 includes on-board processing capability for calculating a position from the received GPS signals), the routine 230 may include instructions that program the processor 226 to receive from the GPS receiver 212 the calculated position of the mobile device 200 and perform some action with the received location, such as causing the processor 226 to transmit the location to the server 102 or causing the processor 226 to invoke another function (e.g., checking traffic, retrieving map data, performing route calculation, etc.).

The routine 230 may generally include instructions for determining and coordinating the reporting to the server 102 of the position and movement of the mobile device 200. This may include determining whether the direction, route, speed, or other parameters of the movement of the mobile device 200 has changed relative to what the mobile device 200 and/or the server 102 is expecting and, is such a change or deviation occurs, reporting to the server 102 the updated location and/or movement parameters. The routine 230 may cause the processor 226 to receive from the GPS receiver 212, for example, multiple consecutive locations and may, accordingly, also determine the direction of travel of the mobile device 200 and the speed at which the mobile device 200 is traveling. The routine 230 may cause the processor 226 to monitor the location and/or movement of the mobile device 200 using data from the GPS receiver 212 and/or data from the sensor block 204, and when the speed, direction, or location changes or deviates from what the processor 226 expects, cause the processor to report the updated parameters to the server 102.

A routine 232 may provide instructions to the processor 226 for determining map data corresponding to the location of the mobile device 200. The routine 232 may cause the processor 226 to retrieve (from the memory 228, from a resource on the Internet, from the server 102, etc.) map data for an area surrounding the location of the mobile device 200. The routine 232 may cause the processor 226 to determine a road segment, indicated in the map data, on which the mobile device 200 is located and/or traveling. In some embodiments, the routine 230 may cause the processor 226 to receive from the GPS receiver 212 more than one GPS location, and the routine 232 may use consecutive GPS locations to determine in what direction and along what road segment the mobile device 200 is moving. In other embodiments, the routine 230 may cause the processor 226 to receive from the GPS receiver 212 a single GPS location, and the routine 232 may cause the processor 226 to use data from the sensor block 204 (e.g., data from the compass 222) to determine the direction that the mobile device 200 is traveling. The processor 226 may use the location and the direction to determine a road segment along which the mobile device 200 is traveling, and a direction along the road segment. As will be described below, the map data and, specifically, the movement of the mobile device 200 along a road segment, may be one parameter used by the processor 226 in accordance with the routine 230 to determine whether to send updated parameters to the server 102.

A route calculation and/or prediction routine 234 includes instructions for causing the processor 226 to determine or predict a route from the current location of the mobile device 200 to an intended destination. Often, for example, fleet management and mobile asset tracking functions include tracking vehicles or other assets as they move from one destination to another, for example, when making deliveries. The routine 234 may include instructions for receiving information about a destination (e.g., an address, intersection, coordinates, etc.) and determining a best (or at least a preferred) route from the current location of the mobile device 200 to the destination. In some embodiments, the routine 234 may include instructions for receiving from the server 102 a predetermined route to a destination, calculated by the server 102 in response to a current location transmitted to the server from the mobile device 200.

The route calculation and/or prediction routine 234 may, in some embodiments, cooperate with a routine 236 for downloading, storing and/or predicting traffic data. The routine 236 may operate to retrieve current and/or historical traffic data for a route predicted or calculated by the routine 234 or for a route received from the server 102. The routine 236 may cooperate with the routine 234 to find alternate routes that have less traffic, in embodiments. In some embodiments, the routine 236 may retrieve traffic data for the purpose of predicting the location and/or movement of the mobile device 200 in the absence of current location data from the GPS receiver 212. That is, given an initial location of the mobile device 200 determined using the GPS receiver 212, the processor 226 may use data from the route prediction and calculation routine 234 with data from the traffic routine 236 and the maps routine 232 to predict, based in part on traffic information, where the mobile device 200 is or will be at some later point.

A power management routine 238 may include instructions that cause the processor 226 to perform various power management activities. For example, in some embodiments, the routine 238 causes the processor 226 to power down the GPS receiver 212 except when the processor 226 determines (e.g., via the routine 230) that a new GPS position is required. The power management routine 238 may also power down other parts of the RF block 202 and/or the sensor block 204 to preserve power when the devices are not being used.

Other routines (not shown) may also be stored on in the memory device 206 including, but not limited to, routines related to an operating system or applications that may execute on the operating system. For example, where the mobile device 200 is a smart phone, an operating system and various applications running on the operating system may be stored on the memory device 208. The routines described above are not intended to be limiting in any way and, of course, instructions described as part of one routine may be included, instead, in another routine. That is, there may be more or fewer routines than described above, and the routines described above may be combined or further divided.

Of course, the mobile device 200 may also include in the input/output block 208 various input and output devices, such as a display 240 and an input device 242. The display 240 may be any type of display device, including (but not limited to) a touch sensitive display device. The display 240 may include or be accompanied by other output devices such as, for example, an audio output device. The input device 242 may be a touch sensitive display (e.g., the display 240) and/or may include a keyboard (hardware or software), a microphone (e.g., with voice recognition software), a mouse, a stylus, switches, buttons, etc.

Lastly, the mobile device includes the power source 210. The power source 210 may be a battery, a fuel cell, a wired power source, or some combination of power sources.

Referring again, briefly, to FIG. 1, the server 102 includes one or more processors 120 communicatively coupled to one or more memory devices 122. The memory device 122 stores various routines for tracking the mobile devices. The routines stored on the memory device 122 may include a route calculation and/or prediction routine 124, similar to the routine 234 described above. The routine 124 may cause the processor 120 to receive the location of a mobile device, for example, and calculate and assign to the mobile device a route to a destination. The routine 124 may also cause the processor, knowing the location of the mobile device and its destination, to predict the route that the mobile device will take. The routine 124 may use the same algorithms as the routine 234, such that the processor 120 and the processor 226, respectively, predict and calculate the same route when the position and destination of a mobile device are known to each.

Similarly, the memory 122 may include a routine 126 for downloading, storing and/or predicting traffic data. Like the routine 236, the routine 126 may operate to retrieve current and/or historical traffic data for a route predicted or calculated by the routine 124. The routine 126 may cooperate with the routine 124 to find alternate routes that have less traffic, in embodiments. In some embodiments, the routine 126 may retrieve traffic data for the purpose of predicting the location and/or movement of the mobile device 200 in the absence of current location data from the GPS receiver 212. That is, given an initial location of the mobile device 200 determined using the GPS receiver 212, the processor 120 may use data from the route prediction and calculation routine 124 with data from the traffic routine 126 to predict, based in part on traffic information, where the mobile device 200 is or will be at some later point.

Generally, the processor 226, after sending initial location data calculated using data from the GPS receiver 212, transmits to the server 102 location data of the mobile device 200 only rarely, in order to prevent unnecessary use of bandwidth and power resources. The processor 226 may monitor various parameters to determine when to send updated location and/or movement data associated with the mobile device 200. In various embodiments, the processor 226 receives or determines one or more of several occurrences that cause the processor 226 to send an updated location of the mobile device 200 to the processor. In one embodiment, the processor 226 determines that the mobile device 200 has changed roads or road segments (e.g., the mobile asset has made a turn). In another embodiment, the processor 226 determines that the velocity of the mobile device 200 has changed significantly (e.g., by an amount greater than a predetermined threshold). In still another embodiment, the processor 226 determines that the mobile device 200 has deviated from a predicted, calculated or assigned route. In yet another embodiment, the processor 226 determines that the distance between a current location of the mobile device 200 and a predicted location of the mobile device exceeds a predetermined distance. In some embodiments, the processor 226 may send updated location information to the server 102 upon the occurrence of any one or more of the determinations. The system and method are illustrated by way of the following examples, which are not intended to be limiting.

Example 1

In an embodiment, a mobile device includes a GPS receiver and a transmitter for communicating data to a tracking server. The processor of the mobile device receives initial location information from the GPS receiver and causes the transmitter to transmit that location information to the tracking server. The processor of the mobile device continues to receive location information from the GPS receiver, allowing the processor to determine and monitor the speed and direction the mobile device is moving. Upon determining the speed and direction of travel of the mobile device, the processor causes the transmitter to transmit to the server the movement information (i.e., the information about the speed and direction of movement). If the mobile device slows down or accelerates by greater than 10 miles per hour (or any predetermined threshold amount), the processor causes the transmitter to send to the tracking server updated position and movement data for the mobile device.

Example 2

In an embodiment, a mobile device includes a GPS receiver, a transmitter for communicating data to a tracking server, and (1) a transceiver (which may include the transmitter) for requesting and receiving data from a map database and/or (2) a map database. The processor of the mobile device receives initial location information from the GPS receiver and causes the transmitter to transmit that location information to the tracking server. The processor of the mobile device retrieves (via the transceiver or from the map database) map information corresponding to the initial position. The processor of the mobile device continues to receive location information from the GPS receiver (only periodically, in some embodiments—e.g., once every 5 seconds, 10 seconds, 1 minute, etc.), allowing the processor to determine and monitor the speed and direction the mobile device is moving. The processor determines, from the position and movement data (i.e., the information about the speed and direction of movement), a road segment along which the mobile device is moving. Upon determining the speed and direction of travel of the mobile device, the processor causes the transmitter to transmit to the server the movement information. The processor continues to monitor the position and movement of the mobile device relative to the road segment. If the mobile device slows down or accelerates by greater than 10 miles per hour (or any predetermined threshold amount), or changes from the road segment to a second road segment (i.e., turns off of the road segment), the processor causes the transmitter to send to the tracking server updated position and movement data for the mobile device.

Example 3

In an embodiment, a mobile device includes a GPS receiver, a transmitter for communicating data to a tracking server, (1) a transceiver (which may include the transmitter) for requesting and receiving data from a map database and/or (2) a map database, and a routine for calculating a route. The processor of the mobile device receives initial location information from the GPS receiver and causes the transmitter to transmit that location information to the tracking server. The processor of the mobile device retrieves (via the transceiver or from the map database) map information corresponding to the initial position, inputting the initial position and an intended destination into the route calculation routine. The processor executing the route calculation routine returns a calculated route from the initial position to the destination. The processor transmits the route information to the tracking server. (In embodiments in which the tracking server implements a complementary route calculation routine, the mobile device need not transmit the route information to the server, because the server will be able to calculate the same route as long as it has the initial position and the intended destination.) The processor of the mobile device continues to receive location information from the GPS receiver (only periodically, in some embodiments—e.g., once every 5 seconds, 10 seconds, 1 minute, etc.), allowing the processor to determine and monitor the speed and direction the mobile device is moving. The processor determines, from the position and movement data (i.e., the information about the speed and direction of movement), a road segment along which the mobile device is moving. Upon determining the speed and direction of travel of the mobile device, the processor may cause (in some embodiments) the transmitter to transmit to the server the movement information. The processor continues to monitor the position and movement of the mobile device relative to the road segment. If the mobile device slows down or accelerates by greater than 10 miles per hour (or any predetermined threshold amount), changes from the road segment to a second road segment (i.e., turns off of the road segment), or deviates from the route calculated by the route calculation routine, the processor causes the transmitter to send to the tracking server updated position and movement data for the mobile device.

Example 4

In an embodiment, a mobile device includes a GPS receiver, a transceiver for communicating data to a tracking server and receiving data from the tracking server, and (1) a transceiver (which may include the transmitter) for requesting and receiving data from a map database and/or (2) a map database. The processor of the mobile device receives initial location information from the GPS receiver and causes the transmitter to transmit that location information to the tracking server. The processor receives from the tracking server a route, determined by a route calculation routine on the server, from the initial position to a destination. The processor of the mobile device retrieves (via the transceiver or from the map database) map information corresponding to the initial position, inputting the initial position and the received route. The processor of the mobile device continues to receive location information from the GPS receiver (only periodically, in some embodiments—e.g., once every 5 seconds, 10 seconds, 1 minute, etc.), allowing the processor to determine and monitor the speed and direction the mobile device is moving. The processor determines, from the position and movement data (i.e., the information about the speed and direction of movement), a road segment along which the mobile device is moving. Upon determining the speed and direction of travel of the mobile device, the processor may cause (in some embodiments) the transmitter to transmit to the server the movement information. The processor continues to monitor the position and movement of the mobile device relative to the road segment. If the mobile device slows down or accelerates by greater than 10 miles per hour (or any predetermined threshold amount), changes from the road segment to a second road segment (i.e., turns off of the road segment), or deviates from the route calculated by the route calculation routine, the processor causes the transmitter to send to the tracking server updated position and movement data for the mobile device.

Example 5

In an embodiment, a mobile device includes a GPS receiver, a transceiver for communicating data to a tracking server and receiving data from the tracking server, (1) a transceiver (which may include the transceiver above) for requesting and receiving data from a map database and/or (2) a map database, a route prediction routine and, optionally, a compass and/or one or more accelerometers. The processor of the mobile device receives initial location information from the GPS receiver and causes the transmitter to transmit that location information to the tracking server. The processor receives from the tracking server a route, determined by a route calculation routine on the server, from the initial position to a destination. The processor of the mobile device retrieves (via the transceiver or from the map database) map information corresponding to the initial position, inputting the initial position and the received route. The processor determines initial movement either from the GPS receiver or from a compass and one or more accelerometers, and transmits the initial movement data to the tracking server. The processor powers down the GPS receiver. The processor, executing the route prediction routine, predicts the location of the mobile device along the route according to the initial movement data. A corresponding prediction routine operating on the tracking server makes the same predictions about the location of the mobile device. The processor periodically (e.g., every minute, two minutes, five minutes, etc.) powers up the GPS receiver and determines the location of the mobile device. If the location of the mobile device differs from the predicted location of the mobile device by more than a predetermined threshold distance (or percentage or time etc.) then the processor transmits updated position and movement data to the tracking server.

Example 6

In an embodiment, a mobile device includes a GPS receiver, a transceiver for communicating data to a tracking server and receiving data from the tracking server, a transceiver (which may include the transceiver above) for requesting and receiving data related to traffic and map data and, optionally, a map database. The processor of the mobile device receives initial location information from the GPS receiver and causes the transmitter to transmit that location information to the tracking server. The processor receives from the tracking server a route, determined by a route calculation routine on the server, from the initial position to a destination. (Alternatively, the processor calculates a route by executing a route calculation routine on the mobile device.) The processor of the mobile device retrieves (via the transceiver or from the map database) map information corresponding to the initial position, inputting the initial position and the received route. The processor determines initial movement either from the GPS receiver or from a compass and one or more accelerometers, and transmits the initial movement data to the tracking server. The processor powers down the GPS receiver. The processor requests and receives information about traffic along the calculated or received route, and, cooperating with a prediction routine, predicts the position of the mobile device as the mobile device moves along the route. A corresponding set of traffic and prediction routines may be executing on the tracking server, providing to the tracking server the same predicted location of the mobile device. The processor periodically (e.g., every minute, two minutes, five minutes, etc.) powers up the GPS receiver and determines the location of the mobile device. If the location of the mobile device differs from the predicted location of the mobile device by more than a predetermined threshold distance (or percentage or time etc.) then the processor transmits updated position and movement data to the tracking server.

Figure 3:
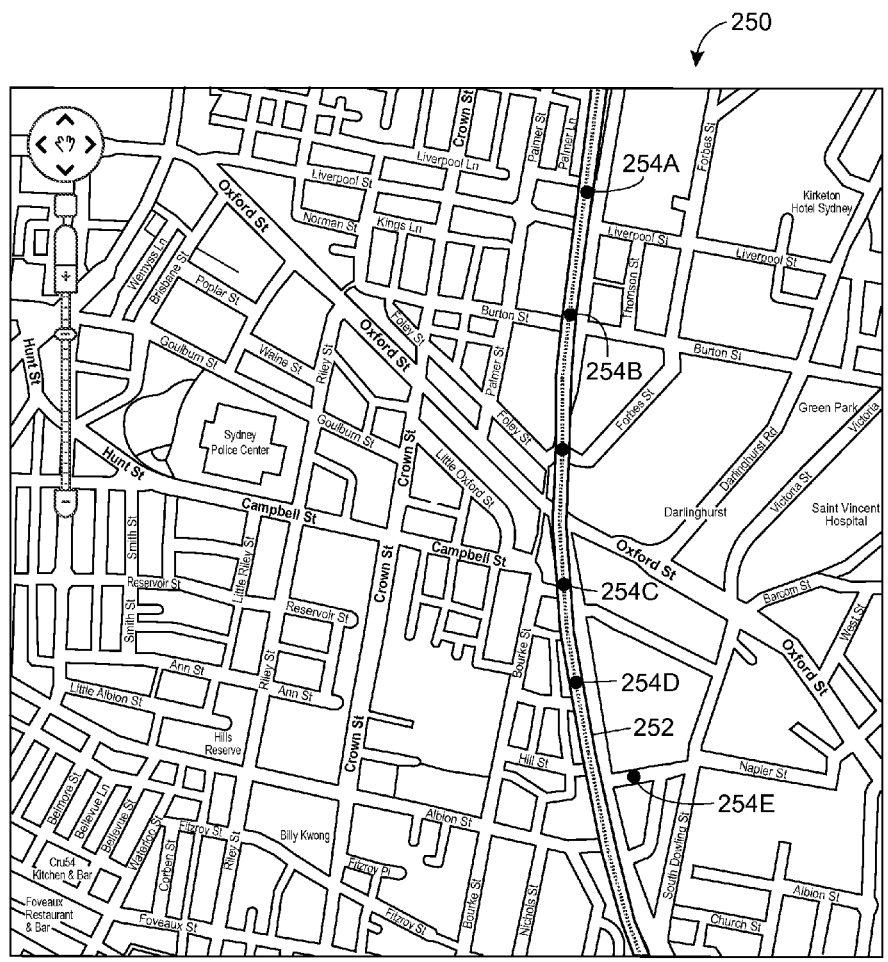
FIG. 3 illustrates an example of the reporting frequency of a mobile device operating according to the principles of the present description.

Turning now to FIG. 3, a map 250 illustrates a route 252 from an initial position (not shown—beyond top left of the map 250) to a destination (not shown—beyond lower right of the map 250). A mobile device associated with a mobile asset traveling along the route 252 may determine (with the GPS receiver), and report to a tracking server (with a transmitter), the position of the mobile asset at a first time associated with the initial position. Periodically, for example at points 254A-E, the mobile device may determine the current location of the mobile asset. At each of the times associated with the points 254A-D, the mobile device will determine that the mobile asset is located on the assigned or calculated route, and will not send updated information to the tracking server. However, at a time associated with the point 254E, the mobile device will determine that the mobile asset is no longer traveling along the calculated or assigned route. This will cause the processor of the mobile device to report the updated position of the mobile asset to the tracking server.

Figure 4:
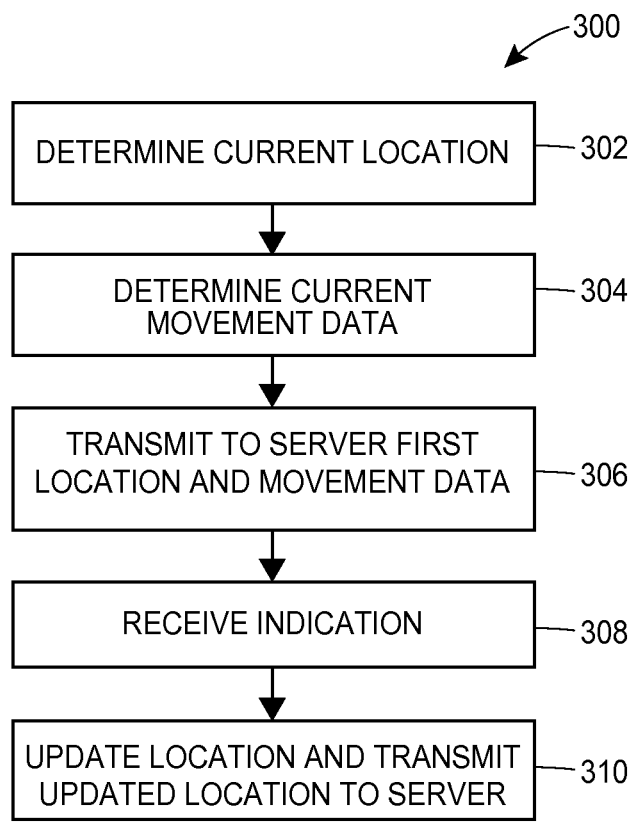
FIG. 4 is a flow diagram of an example method for dynamically determining device location reporting frequency which can be implemented by the device of FIG. 2 in the system of FIG. 1.

FIG. 4 is a flow diagram depicting an exemplary method 300 that may be executed by the processor 226 of the mobile device 200. The processor 226 may determine the position of the mobile device 200 (and the mobile asset) by receiving data from the GPS receiver 212 (block 302). The processor 226 may also determine movement data of the mobile device by receiving additional location data from the GPS receiver 212 or by receiving data from sensors of the sensor block 204, for example the compass 222 or the accelerometer(s) 220 (block 304). The processor 226 transmits the determined position and movement data to the tracking server 102 via a data connection (e.g., the mobile telephony transceiver 214) (block 306). When the processor 226 receives an indication that movement of the mobile device has changed or deviated in some way from the what the processor 226 was expecting (block 308), the processor updates the location (and, in some embodiments, the movement data) and transmits the updated information to the tracking server 102 (block 310).

Figure 5:
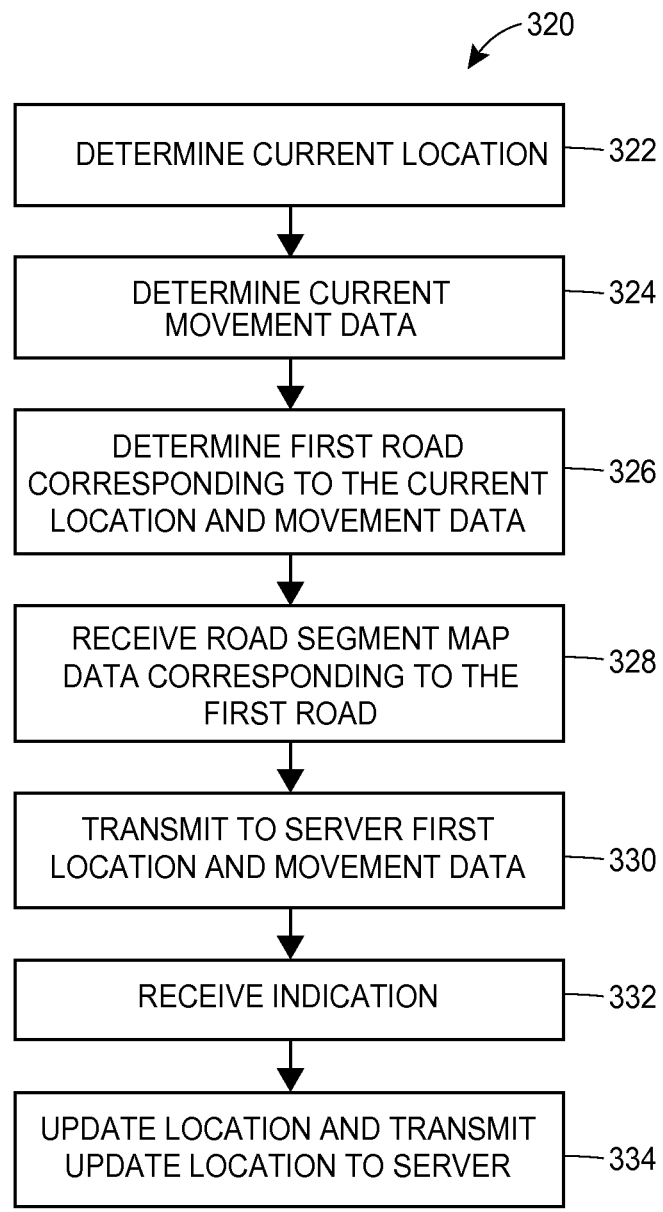
FIG. 5 is a flow diagram of another example method for dynamically determining device location reporting frequency.

FIG. 5 is a flow diagram depicting another exemplary method 320 that may be executed by the processor 226 of the mobile device 200. The processor 226 may determine the position of the mobile device 200 (and the mobile asset) by receiving data from the GPS receiver 212 (block 322). The processor 226 may also determine movement data of the mobile device by receiving additional location data from the GPS receiver 212 or by receiving data from sensors of the sensor block 204, for example the compass 222 or the accelerometer(s) 220 (block 324). The processor 226 determines a first road corresponding to the current location and movement data (block 326). Determining the first road corresponding to the current location may include retrieving map data (block 228) from a map database that is stored in the memory 228, or may include retrieving map data via a data connection such as the mobile telephony transceiver 214. The processor 226 transmits the determined position and movement data to the tracking server 102 via a data connection (e.g., the mobile telephony transceiver 214) (block 330). When the processor 226 receives an indication that movement of the mobile device has changed or deviated in some way from the what the processor 226 was expecting (block 332), the processor updates the location (and, in some embodiments, the movement data) and transmits the updated information to the tracking server 102 (block 334).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations. Though the application describes processors coupled to memory devices storing routines, any such processor/memory device pairing may instead be implemented by dedicated hardware permanently (as in an ASIC) or semi-permanently (as in an FPGA) programmed to perform the routines.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled,"

however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a system for purposes of illustration only. One skilled in the art will readily recognize from the description that alternative embodiments of the structures and methods illustrated herein may be employed without departing from the principles described herein Upon reading this disclosure, those of skill in the art will appreciate still additional alternative structural and functional designs for a system and a process for identifying terminal road segments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method, executed by a processor in a mobile device, for reporting to a server a position of a mobile asset associated with the mobile device, the method comprising:
    determining a current location of the mobile asset;
    determining current movement data of the mobile asset;
    determining a first road corresponding to the current location and movement data;
    receiving road segment map data corresponding to the first road;
    transmitting to the server first location and movement data;
    receiving an indication that (i) the mobile asset has deviated from the path of the first road, or (ii) the velocity of the mobile asset has changed by an amount greater than a predetermined threshold; and
    transmitting to the server, in response to the received indication, updated location and movement data.

2. The method of claim 1, wherein determining current movement data comprises determining first location data and one or both of the speed of the mobile asset and the direction of the mobile asset along the road segment.

3. The method of claim 1, wherein receiving the indication comprises energizing a receiver of signals from a satellite positioning system.

4. The method of claim 1, wherein receiving the indication comprises receiving data from one or more accelerometers communicatively coupled to the processor in the mobile device.

5. The method of claim 1, wherein receiving the indication comprises receiving data associated with one or both of a mobile telephony signal and a wireless broadband signal.

6. The method of claim 1, wherein receiving the indication comprises:
    receiving data associated with a signal other than a signal from a satellite positioning system;
    determining that (i), or (ii) has occurred; and
    energizing a receiver of signals from the satellite positioning system.

7. The method of claim 1, further comprising receiving an indication that (i) the mobile asset has deviated from a predicted or assigned route, or (ii) a difference between a current location of the mobile asset and a predicted location of the mobile asset exceeds a predetermined distance, wherein the predicted or assigned route comprises a route determined according to (1) a destination of the mobile asset known by both the server and the mobile device and (2) a routing algorithm shared by both the server and the mobile device.

8. The method of claim 1, further comprising transmitting to the server an intended route when the mobile asset deviates from the predicted or assigned route.

9. A computer-readable storage medium storing instructions for tracking a mobile asset, executable by a processor in a mobile device, the instructions operable upon execution by the processor to cause the processor to:
    determine a current location of the mobile asset;
    determine current movement data of the mobile asset;
    determine a first road corresponding to the current location and movement data;
    transmit to the server first location and movement data;
    receive an indication that (i) the mobile asset has deviated from the path of the first road, or (ii) the velocity of the mobile asset has changed by an amount greater than a predetermined threshold; and
    transmit to the server, in response to the received indication, updated location and movement data.

10. The computer-readable storage medium of claim 9, wherein the instructions operable to cause the processor to determine current movement data comprise instructions operable to cause the processor to determine first location data and one or both of the speed of the mobile asset and the direction of the mobile asset along the road segment.

11. The computer-readable storage medium of claim 9, wherein the instructions operable to cause the processor to receive the indication comprise instructions operable to cause the processor to energize a receiver of signals from a satellite positioning system.

12. The computer-readable storage medium of claim 9, wherein the instructions operable to cause the processor to receive the indication comprise instructions operable to cause the processor to receive data from one or more accelerometers communicatively coupled to the processor in the mobile device.

13. The computer-readable storage medium of claim 9, wherein the instructions operable to cause the processor to receive the indication comprise instructions operable to cause the processor to receive data associated with one or both of a mobile telephony signal and a wireless broadband signal.

14. The computer-readable storage medium of claim 9, wherein the instructions operable to cause the processor to receive the indication comprise instructions operable to cause the processor to:

receive data associated with a signal other than a signal from a satellite positioning system;

determine that (i), or (ii), has occurred; and energize a receiver of signals from the satellite positioning system.

15. The computer-readable storage medium of claim 9, further comprising instructions operable to cause the processor to:

receive an indication that (i) the mobile asset has deviated from a predicted or assigned route, or (ii) a difference between a current location of the mobile asset and a predicted location of the mobile asset exceeds a predetermined distance; and transmit to the server an intended route when the mobile asset deviates from the predicted or assigned route.

16. A mobile device operable to determine the position of an associated mobile asset and to transmit to a server information about the position of the mobile asset, the mobile device comprising:

a processor;

a satellite positioning system receiver communicatively coupled to the processor and operable to receive a plurality of signals from satellites and to determine from the plurality of received signals a current position of the mobile asset;

a wireless transmitter operable to transmit data to a server via a wireless channel; and a computer-readable storage medium communicatively coupled to the processor storing instructions, executable by the processor, for causing the processor to transmit to the server a current location of the mobile asset when the processor determines that (i) the mobile asset has moved from a first road to a second road, or (ii) the velocity of the mobile asset has changed by an amount greater than a predetermined threshold.

17. The mobile device of claim 16, further comprising one or more accelerometers communicatively coupled to the processor, wherein the processor determines, based at least in part on data received from the one or more accelerometers, one or more of: (i) an estimated current location of the mobile asset, (ii) an estimated current speed of the mobile asset, and (iii) an estimated current direction of the mobile asset.

18. The mobile device of claim 16, further comprising a wireless receiver communicatively coupled to the processor and operable to receive one or more terrestrial signals, wherein the processor determines an estimated current location of the mobile asset based, at least in part, on the one or more terrestrial signals.

19. The mobile device of claim 16, further comprising:

one or more accelerometers communicatively coupled to the processor; and an electronic compass communicatively coupled to the processor, wherein the processor determines, at least in part according to data received from the one or more accelerometers and the electronic compass, an estimated current location of the mobile asset.

20. The mobile device of claim 16, wherein when the processor determines that (i), or (ii), has occurred, the processor:

causes the satellite positioning system receiver to be energized;

determines (a) an updated current location of the mobile asset and (b) updated current movement data of the mobile asset; and transmits to the server, using the wireless transmitter, the updated current location and the updated current movement data.

\* \* \* \* \*